United States Patent Office 3,282,807
Patented Nov. 1, 1966

3,282,807
PROCESS FOR PURIFYING
ELECTRODE SURFACES
John Burnham, 10960 Verano Road, Los Angeles, Calif.
No Drawing. Filed Mar. 30, 1962, Ser. No. 183,757
2 Claims. (Cl. 204—37)

This invention pertains to the purification of metal surfaces and more particularly to the purification of surfaces in anodes for use in electrolytic capacitors.

At the present time a number of different types, sizes and shapes of anodes are utilized in electrolytic capacitors. Also, at the present time electrolytic capacitors employing anodes formed out of the relatively inert valve metal tantalum are being used in place of other older known types of anodes formed out of the valve metal aluminum. It is not considered necessary to set forth in this specification all of the reasons why the tantalum anodes are being utilized instead of older types of anodes.

As tantalum anodes have been utilized to a substantial or material extent in electrolytic capacitors a number of different problems of a technical nature have been encountered. The present invention is concerned with difficulties which have been encoutered with tantalum anodes as a consequence of the presence of impurities upon the surfaces of such anodes. More specifically, it is concerned with the removal of surface impurities from the surfaces of valve metal anodes such as tantalum anodes.

An important one of such impurities is believed to be tantalum carbide. This is a very highly refractory material which is not volatile under the conditions normally encountered in the manufacture of tantlum anodes. This particular compound is occasionally present on surfaces of tantalum foil and wire anodes; it is also encountered on the surfaces in so-called "sintered" tantalum anodes.

Although impurities of the general type indicated in the preceding are normally only present on anode surfaces in a comparatively small or limited amount, these impurities affect anode characteristics to what is considered to be a significant extent. As an illustration of this, the compound tantalum carbide exhibits some semi-conducting properties which affect the performance characteristics of a completed tantalum anode. Further, this compound tends to interfere with the production of a continuous, uniform, adherent tantalum oxide coating necessary for a satisfactory tantalum electrolytic capacitor.

Defects in such oxide coatings caused by impurities, and especially tantalum carbide, are significant in wet type electrolytic capacitor utilizing a liquid electrolyte. In these capacitors there is a certain "healing" tendency so that any discontinuities in the oxide film frequency will tend to remedy themselves during use. No such tendency is, however, apparent in so-called "solid state" electrolytic capacitors. Hence, the presence of discontinuities in the oxide surface within units of this type is extremely detrimental since the oxide film cannot "heal" itself and cannot be covered by a gaseous film formed from the electrolyte utilized.

Because of the effects of surface impurities on anode metal surfaces a number of efforts have been made at eliminating such impurities. These efforts have included a number of steps toward controlling the purity of metal to be used in an electrolytic capacitor anode. Unquestionably steps of this type have proved beneficial in enabling anodes to be produced having better qualities than such anodes would have possessed if proper care during metal processing was not exercised. However, steps of this general type have not proved completely successful.

It has also been known to sinter anode metal surfaces in contact with discrete oxide particles which are at least theoretically capable of reacting with surface impurities. In the manufacture of sintered tantalum anodes metal oxides have been mixed with tantalum particles prior to the sintering of such particles in order to form complete anodes. In theory during such a sintering step the oxide present disassociates so as to produce oxygen capable of reacting with impurities so as to produce volatile reaction products. This type of process is considered disadvantageous for the simple reason that it is not considered sufficiently effective in removing surface impurities. Frequently undesired compound remain upon the surfaces of the anode created in this general manner.

In accordance with the present invention surface impurities on metal surfaces such as tantalum anode surfaces are removed by forming upon such surfaces an adherent oxide film and then heating this film under conditions necessary to cause reactions between surface impurities on the anode and the oxide film initially created and so as to create volatile reaction products. Following this step, in accordance with this invention, an anode is preferably cooled rapidly so that the possibility of surface impurities entering its surface during the cooling step are substantially minimized. An anode prepared in this general manner can then be "formed" or oxidized in accordance with known techniques so as to be provided with a continuous, uniform adherent oxide coating of the type utilized as a dielectric in an electrolytic capacitor of either the wet or solid state type.

The capacitor anodes which may be processed in accordance with this invention may be of virtually any size, shape or surface configuration desired. The invention may be employed with tantalum and other relatively inert "valve" metals and alloys thereof, the oxides of which exhibit assymetical conductance characteristics. Amongst such other materials are niobium and various alloys of tantalum and niobium. Preferably, this invention is utilized with so-called sintered tantalum anodes.

In practicing this invention the surface of any such anode is initially coated with an adherent oxide film. The terms "forming," "anodizing," and "oxidizing" are commonly used in the electrolytic capacitor field in order to designate the creation of such films. Virtually any known electrolyte capable of producing an oxide film which is considered to be "pure" by conventional standards in the electrolyte capacitor field may be utilized in conjunction with known forming equipment in order to create an adherent oxide film used as the initial oxide coating in practicing this invention. Suitable electrolytes are aqueous solutions of sulphuric acid, boric acid, aluminum chloride or the like.

The thicknes of this initial oxide coating may be varied within comparatively wide limits. Preferably it should be sufficiently thick so as to contain a quantity of valve metal oxide sufficient to react with at least all of the impurities present on the surface of the specific anode being treated. The thickness of this oxide layer which should be used with any particular group or batch of anodes created using the same manufacturing conditions may be readily determined by routine experimentation on several different anodes. Such experimentation should be directed towards varying the thickness of an initial oxide coating so as to produce final formed or oxidized anodes which, when used in a complete electrolytic capacitor, have as low a leakage current as possible.

In the electrolytic capacitor field the thickness of an adherent valve metal oxide coating is commonly expressed with reference to the maximum voltage to which an anode is "formed" or oxidized during the creation of such coating. Particularly satisfactory results in accordance with this invention have been achieved by utilizing initial oxide coatings whose thickness can be expressed by stating that these coatings have been created by forming anodes to within the range of about 50 volts to about 100 volts. If the initial oxide coating created in practicing this invention is too thick there is apt to be physical interference between this coating and between various desired reaction products created during the second step used with this invention. Further, the time required for this second step will be much longer than desired if the initial coating is thicker than is necessary to provide sufficient oxygen to react with all surface impurities present.

The second step carried out in practicing this invention involves heating an anode provided with an initial adherent oxide coating as specified above at a temperature sufficient to cause reactions between this oxide coating and the anode surface impurities so as to produce reaction products which are removed in the form of vapor. The reactions involved during this step are, of course, of a time-temperature nature. In general, the higher the temperature the shorter the time required. Particularly satisfactory results have been achieved by heating anodes, coated as set forth in the preceding, at temperatures of about 1800° C. to about 2300° C. for periods of about 5 minutes to about 30 minutes. No harm results from carrying out this heating operation for a greater length of time than is required in order to cause the desired reactions.

During this heating an anode is preferably kept in a vacuum of from about $10^{-6}$ to about $10^{-9}$ millimeters of mercury. Under these conditions volatile decomposition products are, of course, readily removed as they are formed. Thus, for example, in treating sintered tantalum anodes containing surface impurities, such products as carbon monoxide are removed from the surface of the tantalum. In general, if the heating is carried out in the presence of greater pressure than specified above, the surface impurities are not removed. Greater vacuums than those specified can, of course, be employed; but because of availability of equipment and the like vacuums within the range indicated above are normally utilized.

After this heating step is completed the so-treated anodes should, of course, be cooled. Under ambient vacuum conditions as specified in the preceding paragraph there is little chance of the surfaces of these anodes becoming contaminated by "picking up" ambient contaminants prior to the crystalline structures of these surfaces reaching a temperature at which such structures are stable. For this reason it is preferred to cool the anodes either under vacuum conditions such as are employed during the heating operation or in the presence of a completely inert gas which is incapable of contaminating an anode surface.

The more rapidly an anode surface is cooled, the less the chance of such a surface being contaminated by various ambient gases. Hence, it is preferred in practicing this invention to cool anodes, following the heating operation, in a period of one-half hour or less, so that the crystalline surfaces of these structures become "stabilized" or rigid as soon as possible. Such rapid cooling can be achieved by subjecting anodes to helium at room or less temperature during the cooling operation and at either less than atmospheric pressure or at atmospheric pressure.

After an anode is processed as indicated in the preceding, it of course, is treated in accordance with conventional practice so as to be provided with an adherent continuous, uniform valve metal oxide layer prior to its being used in a capacitor. Anodes processed as herein described are considered to be quite desirable for use in either dry or wet type electrolytic capacitors because of the uniform properties or characteristics of such oxide layers. Such uniformity may be indicated by the low leakage currents of such anodes as well as their forming efficiency as measured by the forming rate in volts per minute times the capacity of these units.

The effectiveness of the present invention is considered to be a consequence of the reactive properties of an electrolyte adherent oxide coating employed, as well as a result of the recognition of process conditions necessary to remove surface impurities such as carbon. When the present invention is practiced as described in the preceding the initial oxide coating formed on an anode surface is extremely adherent and is considered to be in direct, intimate contact with any surface impurities, such as carbon, which might affect the ultimate properties of an anode. In prior related processes an initial oxide coating of the same character and same effectiveness is not utilized.

As an aid to understanding this invention the following specific examples of a process as herein described are given for the purposes of explanation. These examples are not to be considered as limiting the invention in any respect inasmuch as specific process conditions must of course be varied in accordance with the characteristics of specific anodes.

*Example I*

In practicing this invention a commercial sintered tantalum anode is formed with an adherent oxide coating to 50 volts in a saturated boric acid aqueous electrolyte. This anode is then throughly washed in distilled water at 100° C. until no chloride ions are detectable. The anode is next dried at 120° C. and is then transferred to a vacuum oven and is heated to a temperature of 2200° C. for a period of about 15 minutes under vacuum at $10^{-6}$ millimeters of mercury. At the end of this period such an anode is cooled under this vacuum until a temperature of about 200° C. is reached. It is then taken out of the vacuum furnace and further cooled in the ambient air. Upon reaching room temperature it can then be anodized in a conventional forming electrolyte prior to assembly in an electrolytic capacitor. Thus, an anode treated as described in this example may be formed to 100 volts in a saturated boric acid electrolyte.

*Example II*

In practicing this invention an adherent oxide coating is electrolytically formed on a niobium sintered anode corresponding to commercially available sintered tantalum anodes in structure in an aqueous electrolyte containing 50 grams ammonium chloride per 100 mm. water by forming this anode to 100 volts. This anode is then washed in distilled water at 100° C. until no chloride ions can be detected. It is next dried at 110° C. and following this is transferred to a vacuum oven. In such an oven it is heated to a temperature of 2300° C. for a period of thirty minutes under a vacuum of $10^{-9}$ mm. of mercury. At the end of this period such an anode is cooled by passing pure helium through the vacuum furnace, maintaining the pressure within the furnace at $10^{-6}$ mm. of mercury until such time as the anode reaches temperature of about 100° C. Such an anode is next taken out of the furnace and further cooled in ambient air to room temperature. It may then be anodized to 100 volts in a saturated aqueous boric acid electrolyte prior to use or anodized in other known, conventional manner.

*Example III*

In practicing this invention an adherent oxide coating is electrolytically formed on a commercially available sintered tantalum anode, having surface carbon impurities considered to be in the form of tantalum carbide, in an aqueous electrolyte containing 50 grams ammonium chloride per 100 mm. water by forming this anode to 50 volts. This anode is then washed in distilled water at 100° C. until no chloride ions can be detected. It is next dried at 110° C. and following this is transferred to a vacuum oven. In such an oven it is heated to a temperature of 1800° C. for a period of 30 minutes under a vacuum of $10^{-9}$ mm. of mercury. At the end of this period such as anode is cooled by passing pure helium through the vacuum furnace at about atmospheric pressure so as to cool such an anode to room temperature in a period of less than one-half of an hour. The so processed anode may then be anodized to 50 volts in a saturated boric acid aqueous electrolyte prior to use or may be formed in accordance with other conventional practice.

What is claimed is:

1. A method for removing carbon from the surface of a sintered tantalum capacitor anode which includes the steps of:

electrolytically forming a tantalum oxide coating on said surface;

heating said anode under a vacuum of from about $10^{-6}$ to about $10^{-9}$ mm. of mercury at a temperature of about 1800° C. to about 2300° C. for a period of at least about five minutes; and cooling the so-heated anode anode to about room temperature.

2. A method for preparing the surface of tantalum capacitor anode which includes the steps of:

electrolytically forming an adherent tantalum oxide coating upon said surfaces in an electrolyte capable of being used to produce a pure oxide film upon said surface;

heating for a period of at least 5 minutes said anode under a vacuum of from about $10^{-6}$ to about $10^{-9}$ millimeters of mercury at a temperature of from about 1800° C. to about 2300° C. so as to react said oxide coating with surface impurities on said tantalum anode and so as to remove the reaction products of such reactions from the surface;

cooling the so-heated anode to room temperature in a period of not more than about one-half hour; and forming adherent oxide coating upon said surface of said tantalum capacitor anode.

References Cited by the Examiner

UNITED STATES PATENTS

| 2,661,329 | 12/1953 | DeLong | 204—37 |
| 2,687,994 | 8/1954 | Russell | 204—37 |
| 2,872,405 | 2/1959 | Miller | 204—290 |
| 2,929,769 | 3/1960 | Newell et al. | 204—290 |
| 2,936,514 | 5/1960 | Millard | 204—37 |
| 2,943,031 | 6/1960 | Wainer | 204—37 |
| 3,100,329 | 8/1963 | Sherman | 204—37 |

FOREIGN PATENTS

| 857,752 | 1/1961 | Great Britain. |
| 912,634 | 5/1964 | Germany. |

OTHER REFERENCES

Chemical Abstracts, 47: 9234d (1953).

Mellor: "Comprehensive Treatise on Inorganic and Theoretical Chemistry," vol. 5, pp. 811–812, 1924.

JOHN H. MACK, *Primary Examiner.*

JOHN R. SPECK, MURRAY TILLMAN, G. KAPLAN, L. G. WISE, W. VAN SISE, *Assistant Examiners.*